(12) United States Patent
Logsdon et al.

(10) Patent No.:    US 12,699,934 B1
(45) Date of Patent:        Aug. 4, 2026

(54) AUTONOMOUSLY SECURING A TRAILER FOR HIRE

(71) Applicants: Matthew Logsdon, Catoosa, OK (US);
          Roy Logsdon, Owasso, OK (US)

(72) Inventors: Matthew Logsdon, Catoosa, OK (US);
          Roy Logsdon, Owasso, OK (US)

( * ) Notice:     Subject to any disclaimer, the term of this
          patent is extended or adjusted under 35
          U.S.C. 154(b) by 0 days.

(21) Appl. No.: 18/597,900

(22) Filed:     Mar. 6, 2024

(51) Int. Cl.
    *G06Q 10/02*        (2012.01)
    *B60D 1/24*         (2006.01)
    *B60D 1/60*         (2006.01)
    *G06Q 30/0645*      (2023.01)
    *G06V 10/70*        (2022.01)
    *G06V 40/16*        (2022.01)
    *G07C 9/00*         (2020.01)
    *G07C 9/25*         (2020.01)
    *G07C 9/28*         (2020.01)

(52) U.S. Cl.
    CPC ............. *G06Q 10/02* (2013.01); *B60D 1/246*
          (2013.01); *B60D 1/60* (2013.01); *G06Q*
          *30/0645* (2013.01); *G06V 10/70* (2022.01);
          *G06V 40/172* (2022.01); *G07C 9/00563*
          (2013.01); *G07C 9/00571* (2013.01); *G07C*
          *9/25* (2020.01); *G07C 9/28* (2020.01); *G07C*
          *2009/00642* (2013.01)

(58) Field of Classification Search
    CPC .......... B60D 1/246; B60D 1/60; B60D 1/605
    See application file for complete search history.

(56)        References Cited

U.S. PATENT DOCUMENTS

| 4,774,823 | A | * | 10/1988 | Callison | ................... | B60D 1/60 |
| | | | | | | 70/57 |
| 6,644,071 | B2 | * | 11/2003 | Gilbertson | .............. | E05B 77/34 |
| | | | | | | 280/507 |
| 10,214,063 | B2 | * | 2/2019 | McDougal | ............... | B60D 1/60 |
| 10,500,911 | B1 | * | 12/2019 | Scarborough | ............ | B60D 1/60 |
| 11,120,518 | B2 | * | 9/2021 | Pellichero | ........... | G06Q 50/265 |
| 11,215,981 | B2 | * | 1/2022 | VanderZanden | ..... | G05D 1/0291 |
| 11,468,503 | B2 | * | 10/2022 | VanderZanden | ...... | H04W 4/022 |
| 11,625,033 | B2 | * | 4/2023 | VanderZanden | ... | G06Q 30/0645 |
| | | | | | | 701/2 |
| 2025/0029175 | A1 | * | 1/2025 | Lin | ........................ | G06Q 10/02 |

* cited by examiner

*Primary Examiner* — Valentin Neacsu
*Assistant Examiner* — Michael R Stabley
(74) *Attorney, Agent, or Firm* — Mitchell McCarthy

(57)        ABSTRACT
A computer product and method for autonomously renting
equipment with a machine learning model that is trained on
a set of positive image pairs and a set of negative image pairs
from prior rental transactions, each pair of images consisting
of an image of a driver license and an image of a selfie
photograph ("selfie"). The method includes receiving a
computer communication from a renter that includes a rental
request to rent the equipment for a rental duration. The renter
is prompted to submit renter data that includes a selfie while
holding his or her driver license. The selfie is preprocessed
to generate a new image pair comprising an image of the
renter's driver license and an image of the renter's selfie.
Machine learning is employed to inference a first probability
that both images in the new image pair are images of the
same person. Upon determining that the probability infer-
ence is less than a predetermined threshold value, the rental
request is denied.

4 Claims, 17 Drawing Sheets

AUTONOMOUSLY SECURING A TRAILER FOR HIRE

RELATED CASE

This application claims benefit to the earlier filing date of U.S. provisional patent application No. 63/450,223 filed on Mar. 6, 2023.

BACKGROUND

Technical Field

The present disclosure generally relates to the difficulty of ensuring the security of equipment in the equipment rental business. More particularly, to high technology security systems that make it possible to do business autonomously.

Description of Related Art

Trailers are constructed in a variety of different ways to serve different purposes, from lightweight utility trailers for hauling small loads like landscape cuttings to heavy-duty trailers for hauling large loads such as automobiles. Like the utility trailer 100 illustrated in FIG. 1, they generally have a structural frame forming a platform 102 for carrying the load and a tongue 104 extending from the front end of the platform 102. Some type of a coupler 106 is attached to the tongue 104. A towing vehicle 108 is equipped with a corresponding type of hitch 110 that is configured to be removably coupled to the trailer's coupler 106. Although FIG. 1 depicts the hitch 110 being attached to the rear end of the towing vehicle 108 (for example, a bumper hitch), the contemplated embodiments are not so limited. In equivalent alternative embodiments the hitch can be mounted elsewhere, such as but not limited to the towing vehicle's bed (for example, a 5th wheel hitch).

An age-old problem is that any trailer, when it is not coupled to a towing vehicle, is susceptible to unauthorized use unless access to the trailer's coupler is somehow restricted. That is, someone with a vehicle having the appropriate hitch can couple it to an unrestricted (unprotected) trailer and make off with it. In fact, an unprotected trailer makes it easier for a thief to steal expensive equipment loaded to the trailer, such as construction equipment, band equipment, and the like. Thefts such as these account for many millions of dollars in economic losses. Most previously attempted solutions employ some type of lock configured to render the trailer's coupler inoperable. But the practical reality is that those solutions are easily defeated by simply picking or cutting the lock off the trailer. At best, they only slow the thief down.

SUMMARY

According to an embodiment, a security system is provided for equipment having a frame including a towing tongue supporting a coupler that defines a hitch socket opening. The security system includes an actuator assembly externally affixed to the tongue and selectively positionable between a first position to cover the hitch socket opening and a second position to uncover the hitch socket opening. A security engine logic is operable in a distributed computer network by computer processing steps that include: storing reservation information in a computer memory portion of the distributed computer network for a user who desires to rent the equipment; after storing the reservation information, subsequently receiving an unlock request from the a user via the distributed computer network; after receiving the unlock request, prompting the user to input additional information via the distributed computer network; comparing the user's reservation information to the additional information; and if the comparing step determines the user's previously stored reservation information matches the user's subsequent additional information then autonomously changing a power setting of the actuator assembly via the distributed computer network.

In an embodiment a security system is provided for equipment having a frame including a towing tongue supporting a coupler that defines a hitch socket opening. The security system has a security device including an actuator mount assembly permanently affixed to the frame and having a first hasp. An actuator is attached to the actuator mount assembly. A slide out assembly is attached to the actuator and is selectively positionable, by activating the actuator, between a first position to close the hitch socket opening and a second position to open the hitch socket opening. A slide out guard assembly has a second hasp and encloses the actuator and the slide out assembly. A removable lock secures the first and second hasps together. Security engines logic is operable in a distributed computer network to process user requests to lock or unlock the security device. A wireless communications interface is autonomously responsive to the security engine logic and is configured to selectively activate the actuator via the distributed computer network.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Although the terms first, second, third, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It is to be understood that other embodiments can be used, and structural or logical changes can be made without departing from the spirit and scope defined by the claims. The description of the embodiments is not limiting. In particular, elements of the embodiments described hereinafter may be combined with elements of different embodiments.

Initially, this disclosure is by way of example only, not by limitation. The illustrative constructions and associated methods disclosed herein are not limited to use or application in any specific system or environment. That is, this disclosure is not limited to a linear reciprocating locking mechanism for selectively blocking access to a trailer coupler, as is disclosed by the slideout in the illustrative embodiments. Thus, although the instrumentalities described herein are for the convenience of explanation, shown and described with respect to exemplary embodiments, the skilled artisan understands that the inventive principles disclosed herein are equally applicable to other types of selectively acting locking mechanisms and associated methods of operation as would be known to a skilled artisan having read this disclosure.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing.

Figure 2:
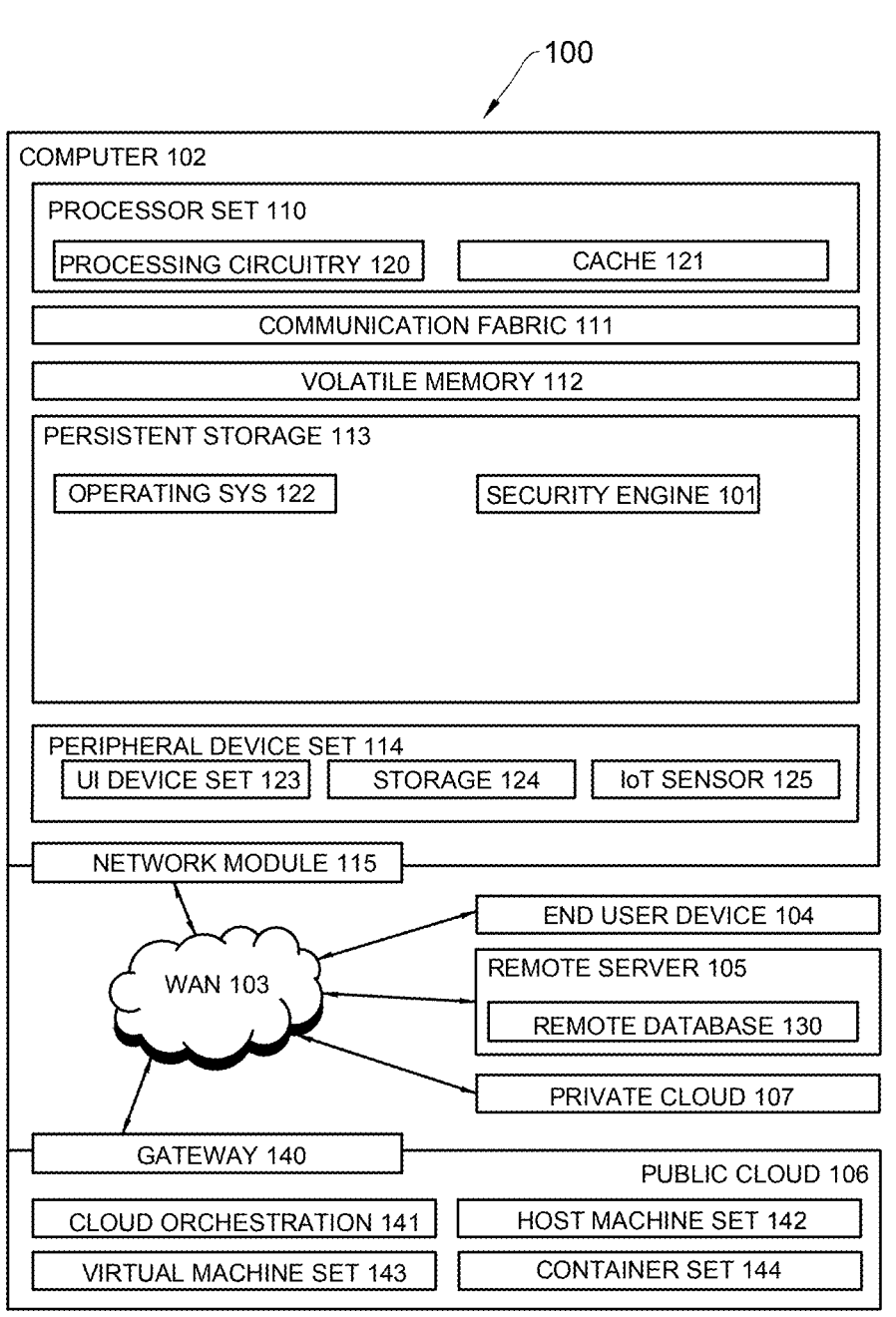
FIG. 2 is a block depiction of a computer hardware platform including a security engine for efficiently and reliably securing rental equipment, consistent with illustrative embodiments.

Referring to FIG. 2, computing environment 100 includes an example of an environment for the execution of at least some of the computer code involved in performing the inventive methods, including a Security Engine ("SE") block 101. In addition to SE block 101, computing environment 100 includes, for example, computer 102, wide area network (WAN) 103, end user device (EUD) 104, remote server 105, public cloud 106, and private cloud 107. In this embodiment, computer 102 includes processor set 110 (including processing circuitry 120 and cache 121), communication fabric 111, volatile memory 112, persistent storage 113 (including operating system 122 and SE block 101, as identified above), peripheral device set 114 (including user interface (UI) device set 123, storage 124, and Internet of Things (IoT) sensor set 125), and network module 115. Remote server 105 includes remote database 130. Public cloud 106 includes gateway 140, cloud orchestration module 141, host physical machine set 142, virtual machine set 143, and container set 144.

The computer 102 can take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations.

The processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 102 to cause a series of operational steps to be performed by processor set 110 of computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 101 in persistent storage 113.

The communication fabric 111 is the signal conduction path that allows the various components of computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

The volatile memory 112 is any type of volatile memory now known or to be developed in the future. Examples include dynamic type random access memory (RAM) or static type RAM. In computer 102, the volatile memory 112 is located in a single package and is internal to computer 102, but, alternatively or additionally, the volatile memory may be distributed over multiple packages and/or located externally with respect to computer 102.

The persistent storage 113 is any form of non-volatile storage for computers that is now known or to be developed in the future. The non-volatility of this storage means that the stored data is maintained regardless of whether power is being supplied to computer 102 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block SE block 101 typically includes at least some of the computer code involved in performing the inventive methods.

The peripheral device set 114 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 102 is required to have a large amount of storage (for example, where computer 102 locally stores and manages a large database) then this storage may be provided by peripheral storage devices designed for storing very large amounts of data, such as a storage area network ("SAN") that is shared by multiple, geographically distributed computers. IoT sensor set 125 is made up of sensors that can be used in Internet of Things applications. For example, one sensor may be a thermometer and another sensor may be a motion detector.

The network module 115 is the collection of computer software, hardware, and firmware that allows computer 102 to communicate with other computers through WAN 103. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking ("SDN")), the control functions and the forwarding functions of network module 115 are performed on physically separate devices, such that the control functions manage several different network hardware devices. Computer readable program instructions for performing the inventive methods can typically be downloaded to computer 102 from an external computer or external storage device through a network adapter card or network interface included in network module 115.

The wide area network ("WAN") 103 is any wide area network (for example, the internet) capable of communicating computer data over non-local distances by any technology for communicating computer data, now known or to be developed in the future. In some embodiments, the WAN 103 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

The end user device 104 is any computer system that is used and controlled by an end user (for example, a customer of an enterprise that operates computer 102) and may take any of the forms discussed above in connection with computer 102. EUD 104 typically receives helpful and useful data from the operations of computer 102. For example, in a hypothetical case where computer 102 is designed to provide a recommendation to an end user, this recommendation would typically be communicated from network module 115 of computer 102 through WAN 103 to EUD 104. In this way, EUD 104 can display, or otherwise present, the recommendation to an end user. In some embodiments, EUD 104 may be a client device, such as thin client, heavy client, mainframe computer, desktop computer and so on.

The remote server 105 is any computer system that serves at least some data and/or functionality to computer 102. Remote server 105 may be controlled and used by the same entity that operates computer 102. Remote server 105 represents the machine(s) that collect and store helpful and useful data for use by other computers, such as computer 102. For example, in a hypothetical case where computer 102 is designed and programmed to provide a recommendation based on historical data, then this historical data may be provided to computer 102 from remote database 130 of remote server 105.

The public cloud 106 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 106 is performed by the computer hardware and/or software of cloud orchestration module 141. The computing resources provided by public cloud 106 are typically implemented by virtual computing environments that run on various computers making up the computers of host physical machine set 142, which is the universe of physical computers in and/or available to public cloud 106. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 106 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

The private cloud 107 is similar to public cloud 106, except that the computing resources are only available for use by a single enterprise. While private cloud 107 is depicted as being in communication with WAN 103, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 106 and private cloud 107 are both part of a larger hybrid cloud.

Figure 3:
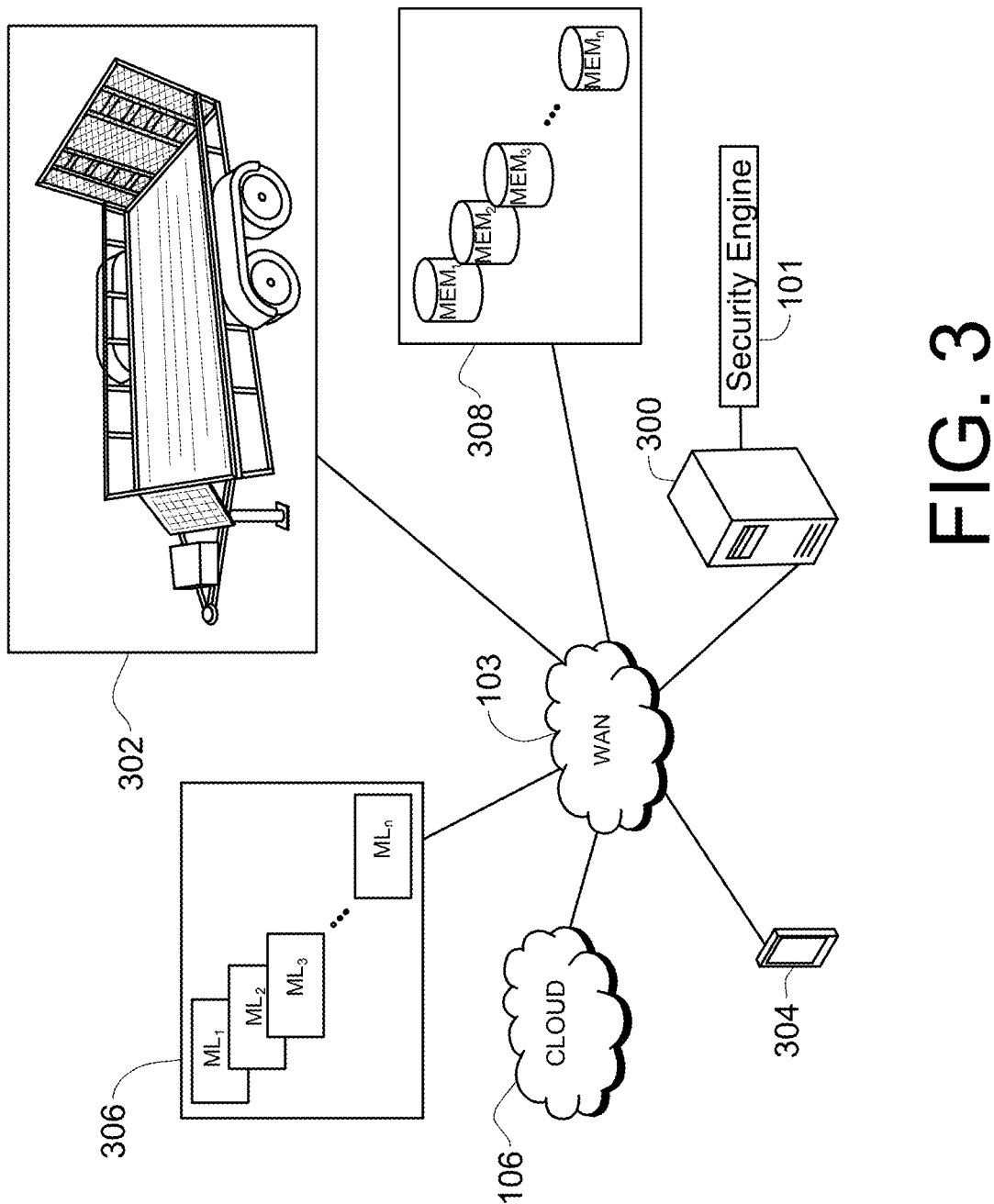
FIG. 3 illustrates a distributed operating environment for the security engine in FIG. 2, consistent with illustrative embodiments.

FIG. 3 conceptually illustrates the processing power of the computer 102 of FIG. 2 in a centralized computer server 300 overseeing a distributed computing system architecture for adaptively securing a rental trailer, consistent with illustrative embodiments. The computer server 300 can be configured for expansive network and satellite communications, such as via the WAN 103, with computer interfaces in each rented trailer 302, and with customers via consumer-electronic user devices 304. The user devices 304 can send and receive information throughout the network 103. They can include stationary computing devices such as desktop computers and enterprise computing systems, as well as portable computing devices such as laptop computers, portable handsets, a mobile phone computing device, a vehicle communications system, a smart appliance such as a smart television or projector, tablet computers, personal digital assistants ("PDAs"), a wearable computing device such as a smart watch, glasses, virtual or augmented reality computing devices, and the like.

In these embodiments, the distributed computing resources available to the server 300 include any number of computer machine learning resources 306, and computer memory 308 for data storage. "Machine learning" broadly describes a function of an electronic system that learns from data. A machine learning system, engine, or module can include a trainable machine learning algorithm stored in computer memory that can be trained, such as in an external cloud environment, to learn functional relationships between inputs and outputs that are currently unknown.

Machine learning can be utilized to solve a variety of technical issues (e.g., learning previously unknown functional relationships) in connection with technologies such as, but not limited to, machine learning technologies, time-series data technologies, data analysis technologies, data classification technologies, data clustering technologies, trajectory/journey analysis technologies, medical device technologies, collaborative filtering technologies, recommendation system technologies, signal processing technologies, word embedding technologies, topic model technologies, image processing technologies, video processing technologies, audio processing technologies, and/or other digital technologies.

Machine learning can be utilized to solve a variety of technical issues (e.g., learning previously unknown functional relationships) in connection with technologies such as, but not limited to, machine learning technologies, time-series data technologies, data analysis technologies, data classification technologies, data clustering technologies, trajectory/journey analysis technologies, medical device technologies, collaborative filtering technologies, recommendation system technologies, signal processing technologies, word embedding technologies, topic model technologies, image processing technologies, video processing technologies, audio processing technologies, and/or other digital technologies.

Accordingly, the computer 102 (FIG. 2) has a specialized processing unit, such as the SE block 101 and the like, for carrying out ML-based computations. More particularly, without limitation, the specialized processing unit automatically and consistently deploys ML in adaptively serving held content during an automated communication session. The computer system is thereby specifically configured to provide technical improvements to data systems, machine learning systems, artificial intelligence systems, and systems of data analysis systems such as but not limited to data classification systems, data regression systems, data clustering systems, and the like. The ML output can further provide one or more inferences, provide one or more predictions, and/or determine one or more relationships among the data. For example, ML serving as described herein may model one or more inferences and/or predictions and/or may determine one or more relationships amongst the variables analyzed in the data. An ML model is produced for predicting outputs, e.g., probabilities, at factual (historical) action values from a training dataset of historical data. The ML model that is optimized is, however, far more accurate and efficient than traditional hold time predicting. Thus, the ML model optimization that is produced helps with downstream decision making, even with such downstream decision making that is automated.

The ML resources can employ any suitable ML based techniques, statistical-based techniques and/or probabilistic-based techniques. For example, the ML resources can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, and the like. For example, the ML resources can perform a set of clustering ML computations, a set of logistic regression ML computations, a set of decision tree ML computations, a set of random forest ML computations, a set of regression tree ML computations, a set of least square ML computations, a set of instance-based ML computations, a set of support vector regression ML computations, a set of k-means ML computations, a set of spectral clustering ML computations, Gaussian mixture model ML computations, a set of regularization ML computations, a set of rule ML computations, a set of Bayesian ML computations, a set of deep Boltzmann computations, a set of deep belief network computations, a set of convolution neural network computations, a set of stacked auto-encoder computations and/or a set of different ML computations.

Accordingly, the distributed computing system generally facilitates optimizing ML serving predictions in accordance with one or more embodiments illustratively described herein. For example, the optimizations can be related to a ML system, an artificial intelligence system, a collaborative filtering system, a recommendation system, a signal processing system, a word embedding system, a topic model system, an image processing system, a data analysis system, a media content system, a video-streaming service system, an audio-streaming service system, an e-commerce system, a social network system, an internet search system, an online advertisement system, a medical system, an industrial system, a manufacturing system, and/or another digital system. The system can employ hardware and/or software to solve problems that are highly technical in nature, that are not abstract and that cannot be performed as a set of mental acts by a human.

For simplicity of explanation, the specialized-computer-implemented methods are depicted and described as a series of acts. It is to be understood and appreciated that the subject innovation is not limited by the acts illustrated and/or by the order of acts. That is, for example, acts can occur in various orders and/or concurrently, and with other acts not presented and described herein. Furthermore, not all expressly disclosed acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from a computer-readable device or storage media.

The system can employ hardware and/or software to solve problems that are highly technical in nature, that are not abstract and that cannot be performed as a set of mental acts by a human. One or more embodiments of the system can also provide technical improvements to a computer processing unit associated with a ML process by improving processing performance of the computer processing unit, reducing computing bottlenecks of the computer processing unit, improving processing efficiency of the computer processing unit, and/or reducing an amount of time for the computer processing unit to perform the ML process.

Figure 4:
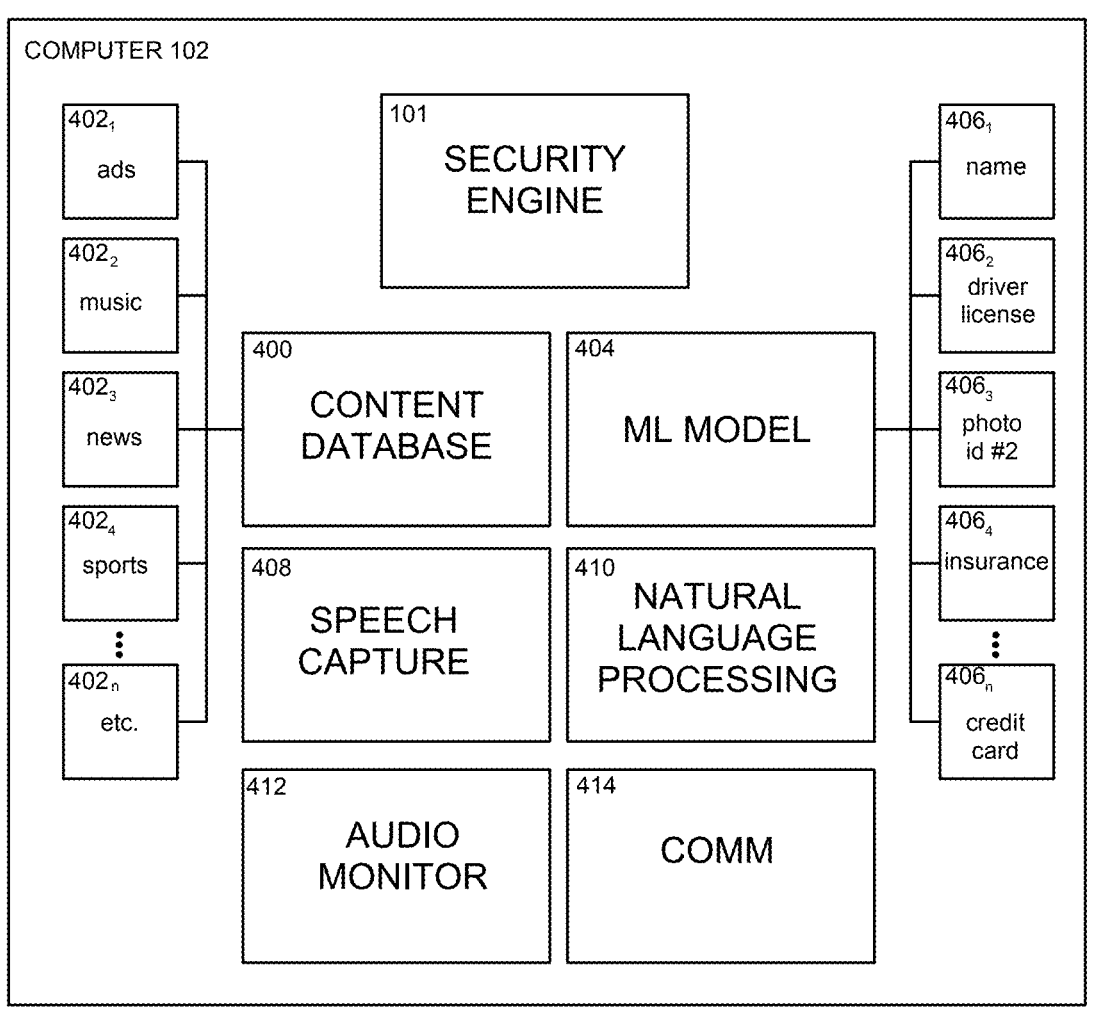
FIG. 4 is a block depiction of an operating environment for the security engine in FIG. 2, consistent with illustrative embodiments.

FIG. 4 further illustrates a high-level block diagram of the SE block 101 operating environment. For the sake of clarity, the components of FIG. 4 can be physically located anywhere, in part or in whole, that is accessible, such as via WAN 103, including the server 300, a rented trailer 302, the remote computing resources 306, 308, cloud-based resources 106, and the like. For example, one or more components of FIG. 4 can be implemented on one or more computing devices and/or systems other than the computer 102, that are in network communication with the computer 102. Each of the other computing devices and/or systems can have computer memories for data storage and software/firmware applications, processors for accessing data and executing applications, and other components that facilitate network communications. In other words, the SE block 101 can be performed by one or more distributed computing devices across multiple remote locations. Thus, the SE block 101 can be implemented as computer programs running on one or more computers running in one or more locations that are coupled to each other through a network.

In illustrative implementations, the specialty computer 102 is programmed to automatically engage in a user's communication session in whatever form necessary. For example, the computer 102 can monitor the contents of an audio stream during the user's communication session, and/or monitor the contents of user-provided inputs during the user's communication session. For example, in response to certain content the computer 102 can execute certain predefined routines. In other examples, the computer 102 can utilize speech recognition resources to convert the user's spoken words into understandable text language and respond to the user text accordingly in text language. In some embodiments, as discussed below, the computer 102 can thereby identify when a computer transaction has been requested during a user communication.

In these illustrative embodiments, the SE block 101 can access a content database block 400. This enables selectively serving any of a number of prerecorded audio content clips 402 during a user communication session. For example, audio content in the forms of promotional advertisement clips 4021, music clips 4022, news clips 4023, sports clips 4024 and the like can be individually selected and served during a communication session. The clips 402 can be organized into different types, interests, categories, and so on. Appropriate clips 402 can be selected for presentation to users when they are put on hold, based on a user's demographics and interests. Clips 402 can be provided of varying durations, so that the SE block 101 can select content 402 that best matches a present need during a communication session.

The SE block 101 can also employ a ML model block 404 to gain access to one or more ML models that are trained in terms of pertinent feature domains. For example, the ML model(s) can be trained in terms of historical renter data such as name, driver license, photo ID, insurance, credit card, and other such data. The SE block 101 can access the ML model resources 306 such as to obtain inference services from historical data, and/or to further train the ML model(s) with new training data.

A speech capture block 408 can be configured to capture the user's speech such as via a microphone. It can convert the captured audio content such as into text language ("STT"), and/or it can convert text language into audio content ("TTS"). A natural language processing block 410 can receive free-form language input and generate annotated output. For instance, the block 410 can include a speech tagger configured to annotate terms with grammatical information. The block 410 can also or alternatively include an entity tagger configured to annotate the terms with entity references, such as references to people, places, organizations, and the like. The block 410 can also or alternatively include a dependency parser configured to annotate terms with syntactic relationships. The block 410 can also or alternatively include a coreference resolver configured for contextual groupings. These components of the block 410 can cross-rely on the generated annotations. For example, the entity tagger can rely on annotations by the coreference resolver, and so on.

An audio stream monitor 412 can be configured to monitor the incoming and/or outgoing portions of an audio stream during a user's communication session. Furthermore, the SE block 101 can leverage a communications block 414 that interfaces with a call holding management service enabling efficient and consistent network communications. For example, the communications block 412 can be configured to implement and supervise wired communication, such as Ethernet communication and/or telephone landline communication, and wireless communication, such as WiFi communication, Bluetooth communication, cellular voice and/or data communication, Near-Field Communication (NFC), and the like.

Figure 5:
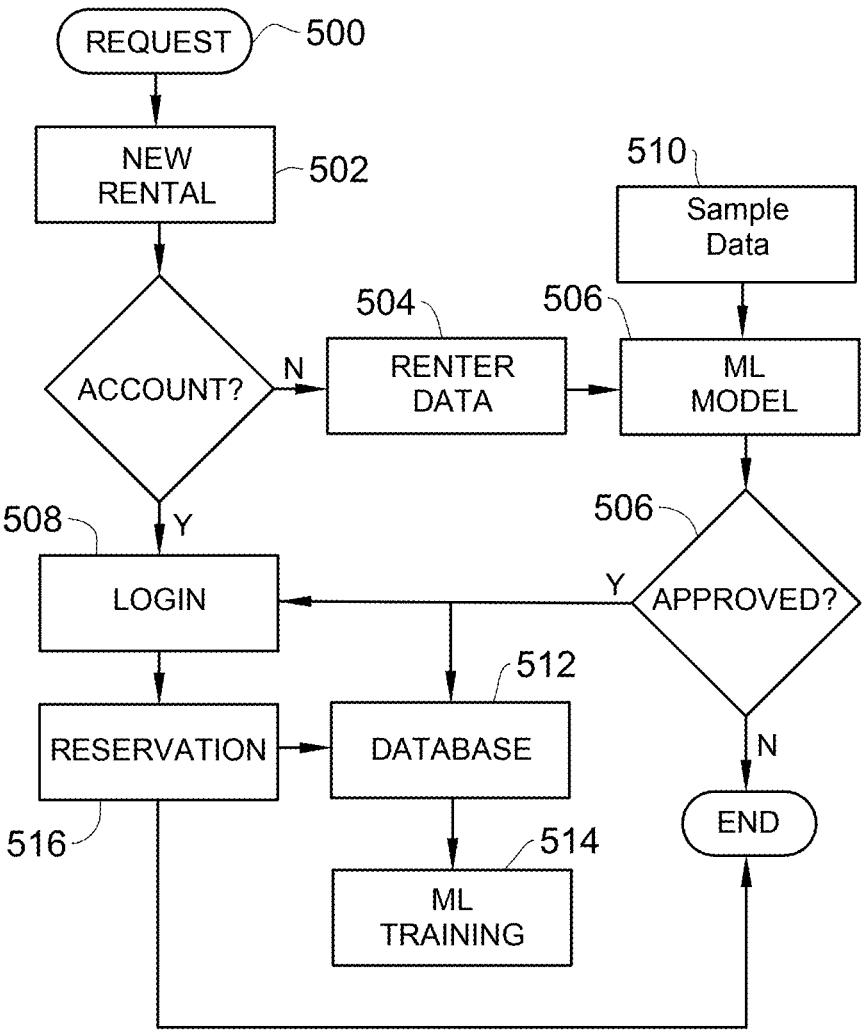
FIGS. 5-8 are flowcharts depicting computer methods by the security engine in FIG. 2, consistent with illustrative embodiments.

Recall from the prior discussion of FIG. 2 that in illustrative embodiments the SE block 101 can be a computer program product ("CPP"). The CPP can include the computer readable storage medium 113 and program instructions embodied therewith, and the processor 110 configured to execute the program instructions. FIG. 5 is a flowchart depicting steps in a method 500 performed by the SE block 101 upon executing its program instructions, consistent with illustrative embodiments. The method 500 can begin with block 502 receiving a computer communication from a renter. If the renter is an existing customer in good standing, then login block 508 will accept his already-issued login credentials and permit him access to the SE block 101 for conducting a business transaction. If the renter is not an existing customer, block 504 controls the process of beginning a new customer application. Digital images can be required, such as driver license, a selfie of the renter holding the driver license, insurance verification, and the like. Other information can be transmitted such as payment data.

The SE engine 101 preprocesses the renter data 504 to make it suitable for machine learning 506. An ML data pipeline functions on one end to extract datasets from stored sample data 510. On the other end, the data pipeline functions to supply the datasets to one or more high-speed training trials running on many ML models. In between, the data pipeline functions to preprocess the datasets into proper form to run reliably on the ML models.

At the first end, the sample data 510 can be stored in the same or multiple computer memories. Extracting datasets from the sample data 510 can involve many formatting operations, such as joining data tables together and the like. Preprocessing the datasets can involve many transformative operations, such as resizing images, decoding videos, augmenting data, and the like. The preprocessing can include multiplexing a feature datastream and a label datastream into a unified complex datastream to the training trials. The labels can be cross-ids for the images, and the like. This label processing can include transforming integer values to tensor values for performing classification modeling.

The ML pipeline extracts verification information from the preprocessed renter data 504 such as ensuring the driver license is valid, meaning it is not expired or suspended, the driver is at least 21 years old, and the like. Insurance coverage is confirmed as to it being valid and meeting the coverage requirements stated in the rental agreement.

Figure 6:
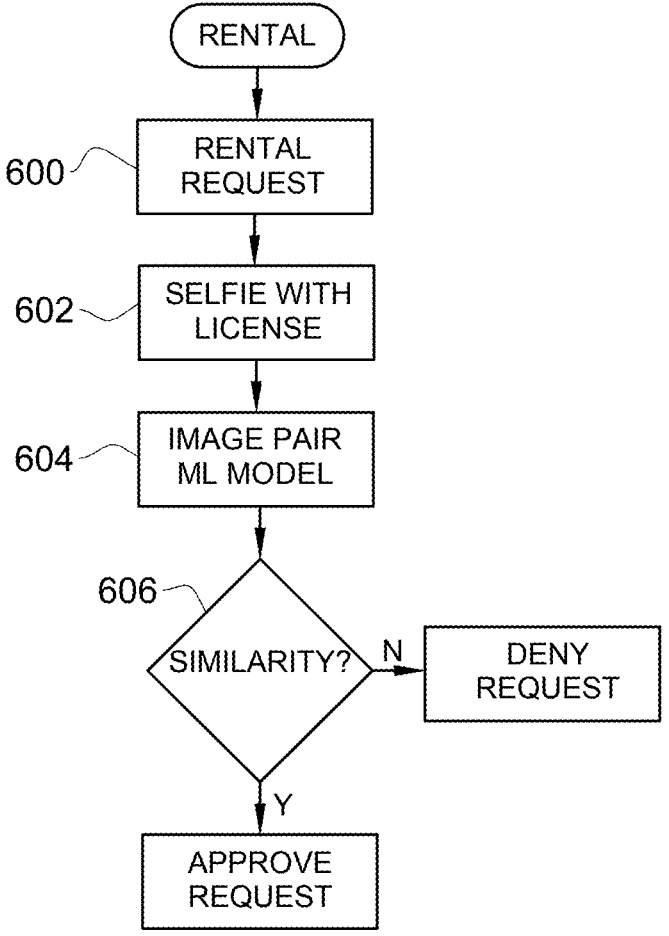

A convolutional neural network can process this image pair, the renter's selfie photograph ("selfie") and his or her photo-identification. In one example, a Siamese network can be trained to apply pairwise similarity to few-shot learning techniques for new customers. FIG. 6 depicts the workflow can begin with block 600 receiving a computer communication from a renter that includes a rental request to rent the equipment for a rental duration. Block 602 prompts the renter to submit renter data that can include a selfie while holding his or her driver license. Block 604 preprocesses the selfie to generate a new image pair, an image of the renter's driver license and an image of the renter's selfie. A convolutional neural network computes complex multidimensional vectors in Euclidean space to infer a probability that both images in the new image pair are images of the same person. Block 606 approves or denies the rental request based on a probabilistic inference defining a threshold of similarity.

Returning to FIG. 5, if approved, the new customer is granted login credentials recognizable to the login block 508. The new customer information is stored by database block 512 and can be included in the next epoch of ML training by block 514.

Once logged in, block 516 allows the renter to manage existing and new business transactions. For instance, the renter can check the status of an existing reservation or make a new reservation to rent a trailer for a specified duration defined by a beginning day and time and an ending day and time. A particular trailer can be selected to be picked up at a designated location. After the renter confirms the business transaction details, closing documents with verified signatures, such as the rental agreement and warranties and representations and the like, can be obtained electronically. The reservation can be stored to the database 512 along with the closing documents and information all indexed to the renter's personal information.

Figure 7:
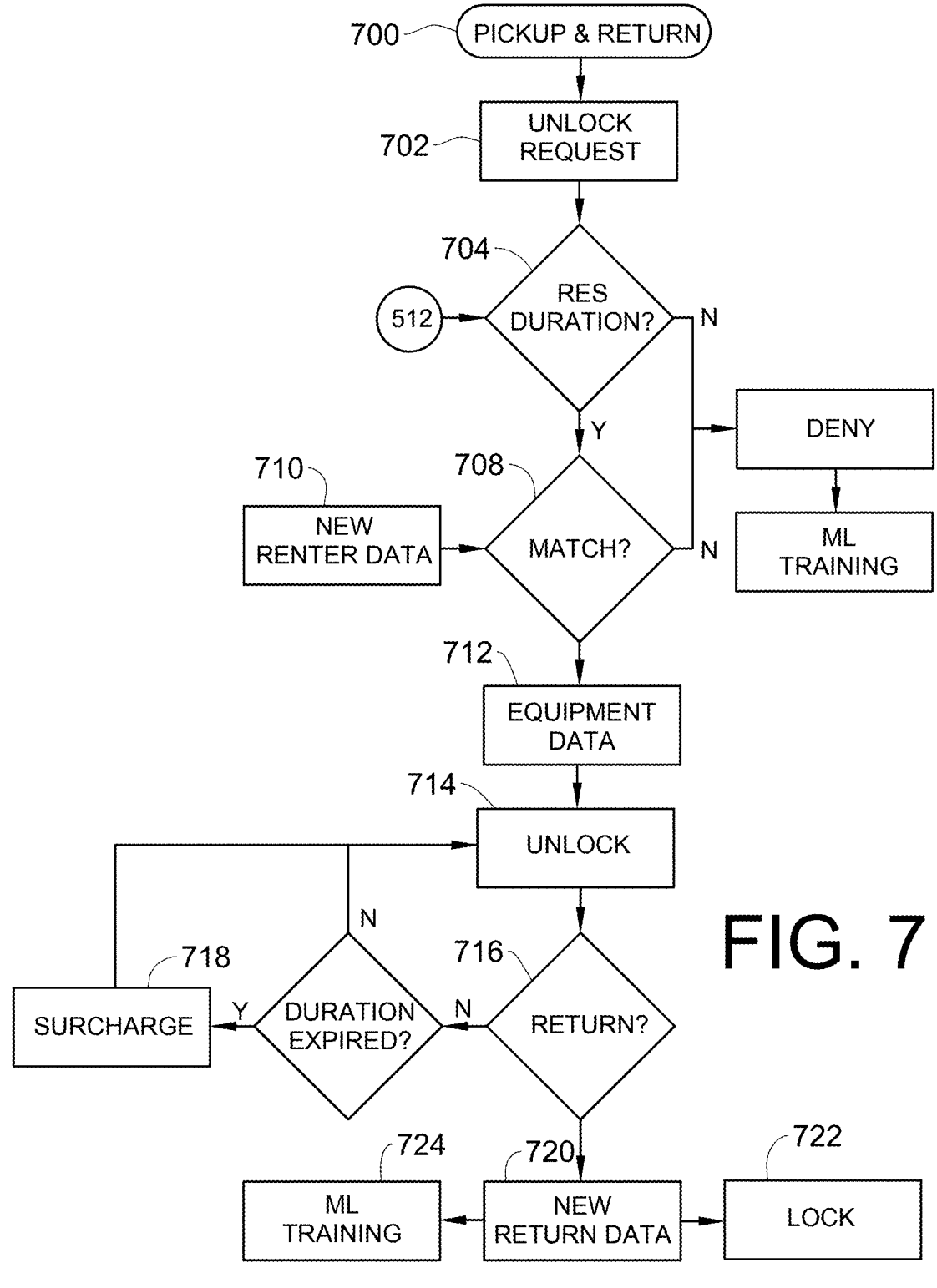

FIG. 7 is another flowchart depicting continuing steps in a method 700 performed by the SE block 101 for picking up and returning the rented trailer. The process begins when the SE block 101 receives a subsequent computer communication from the renter with an unlock request 702 to unlock a security device on the rented trailer. Block 704 first confirms the unlock request 702 is associated with an existing reservation by cross referencing the database 512 (FIG. 5), and that the unlock request 702 is received during the rental duration specified by a valid reservation. If not satisfied, then it can deny the unlock request 702 and provide an explanation for the denial to the renter. If, however, block 704 is satisfied, control can then pass to block 708 requiring the renter to submit additional renter data 710.

The renter can be prompted to enter the additional data to confirm he is the same person who executed the rental agreement. The type of additional data for this purpose can be probabilistically controlled by the ML block 506. For instance, an existing customer in good standing can be held to a relatively low level of scrutiny, such as a multiple factor authentication, whereby a text message or phone call can be transmitted to the cell phone number defined in the reservation prompting the user to respond with a digital code. For higher scrutiny, the renter can be prompted to take and send another selfie while holding his driver license. This provides new image samples for comparison to the stored image samples.

Figure 8:
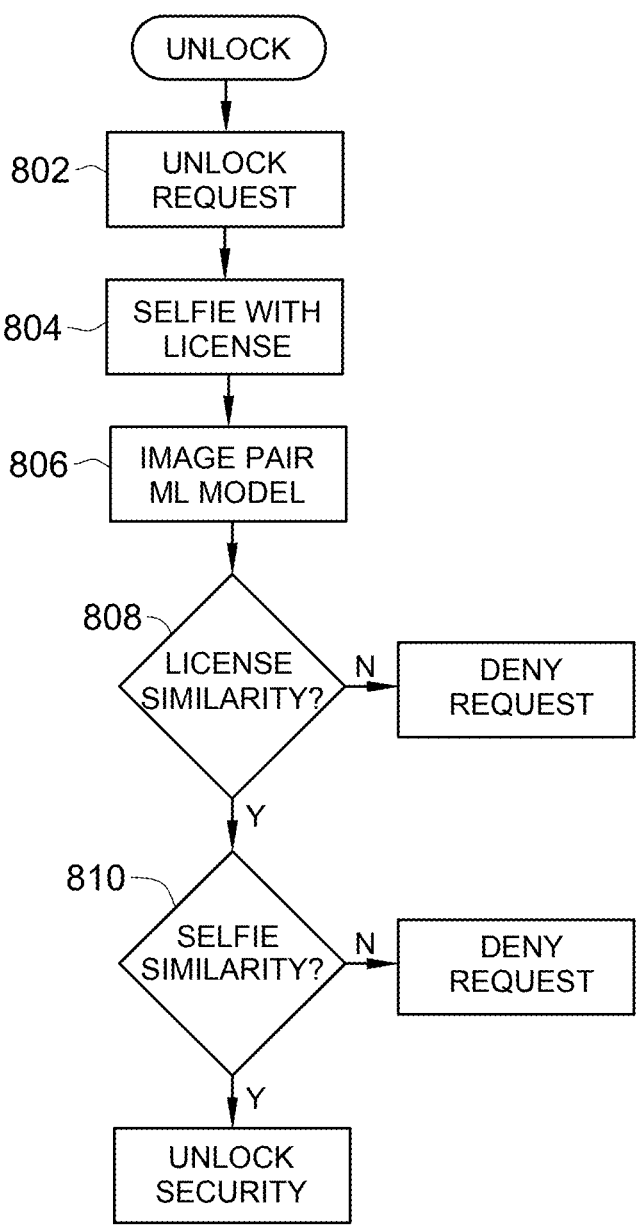

FIG. 8 depicts a workflow can begin with block 802 receiving a subsequent communication from the renter that includes an unluck request to unlock the equipment. Block 804 prompts the renter to submit additional renter data, such as a second selfie while holding his or her driver license. Block 806 can apply the ML pipeline resources to preprocess the second selfie to generate a second new image pair, the second image of the renter's driver license and a second image of the renter's selfie. The CNN can infer a probability that the first image of the renter's driver license and the second image of the renter's driver license are images of the same document. Block 806 can further infer a probability that the first selfie and the second selfie are images of the same person. Block 808 can deny the unlock request for probabilities less than a predetermined threshold value or target. Block 810 can approve or deny the unlock request based on a probabilistic threshold of similarity.

Returning to FIG. 7, block 708 can obtain global position system ("GPS") coordinate metadata from whatever new renter data is transmitted and can use the GPS data to confirm the renter is in near proximity to the rented trailer. If renter location and a predetermined threshold pairwise similarity is not satisfied, then block 708 can deny the unlock request 702 and send an explanation for the denial to the renter. The new renter data can be included, in part or in whole, into a future ML model training epoch.

If block 708 is satisfied, then block 712 can prompt the renter to enter equipment data 712. The renter can be prompted to locate the rented trailer according to prominent indicia markings on the trailer. The renter can be prompted to send data verifying his selection of the rented trailer, such as by entering the identification number on the rented trailer or by scanning a QR code on the rented trailer, and the like. The renter can also be prompted to send one or more pictures of the trailer to baseline its condition at the beginning of this rental transaction. The ML model block 506 (FIG. 5) can confirm trailer identity by using stored images of the rented trailer to compute pairwise similarity probabilities.

In response to receiving satisfactory equipment data, the unlock request 702 at this stage can autonomously, such as via an application programming interface, remotely switch power on to the rented trailer's security device to enable its onboard electronics. The term "autonomously," for purposes of this description and meaning of the claims, means automatically performing one or more computer process or method steps without any human intervention. Telemetric positional and/or proximity controls on the trailer and/or the security device can provide operational feedback to confirm proper operations throughout the rental duration. Block 714 can transmit a computer network communication including a signal to remotely unlock the security device and then turn its power off during the rental duration.

Figure 9:
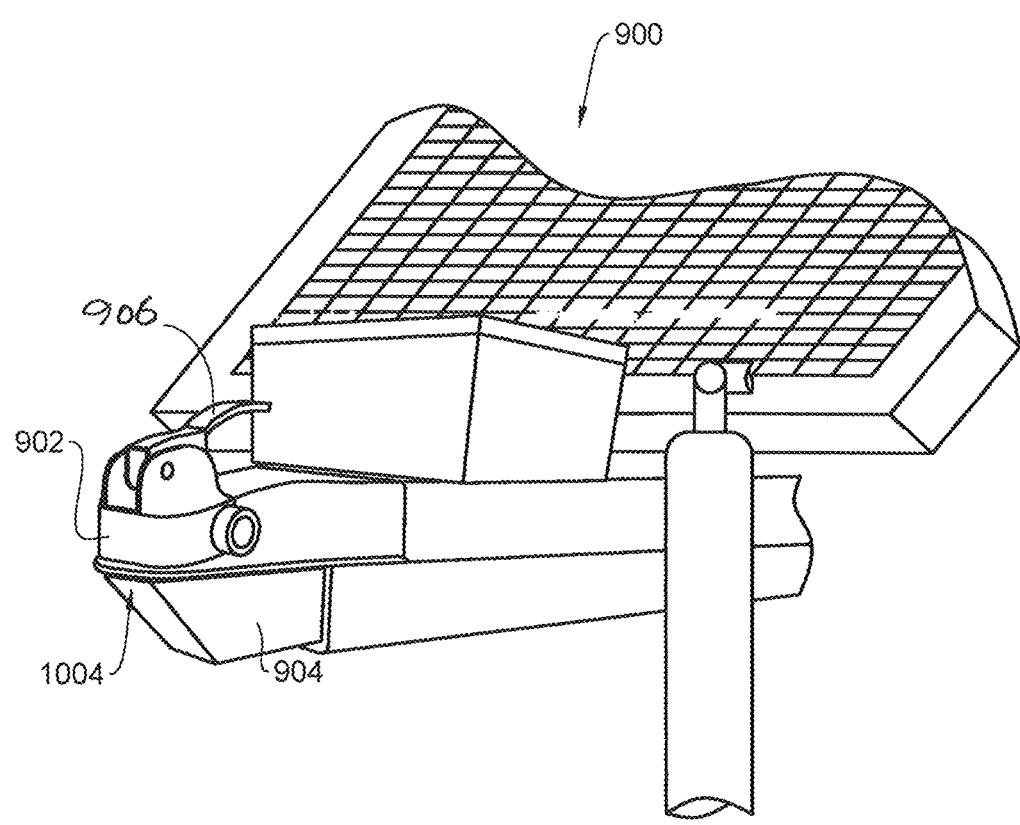
FIG. 9 is an isometric depiction of the trailer tongue and a trailer security device in the locked condition to secure the trailer, consistent with illustrative embodiments.

FIG. 9 depicts one type of trailer security device 900 that is well suited for remote control by the SE engine 101. The security device 900 is installed on a trailer tongue that has a ball-type coupler 902. The class I straight-tongue type of coupler depicted in FIG. 9 is merely illustrative, not limiting in any way of the contemplated embodiments of this invention. The skilled artisan will readily ascertain how the principles of this invention can alternatively be adapted to other types of couplers such as but not limited to A-frame tongue couplers, gooseneck couplers, adjustable couplers, and the like for any size of fixed or interchangeable ball hitch, and for any rating in class I through class V.

Figure 1:
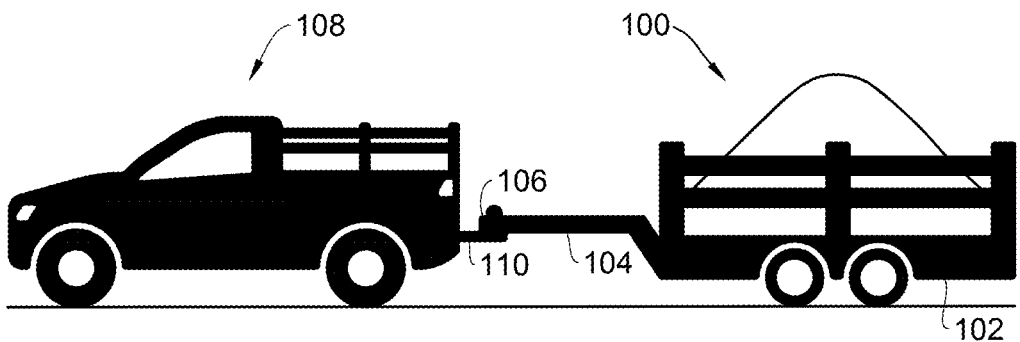
FIG. 1 illustrates a trailer being towed by a towing vehicle, consistent with illustrative embodiments.
Figures 10A, 10B:
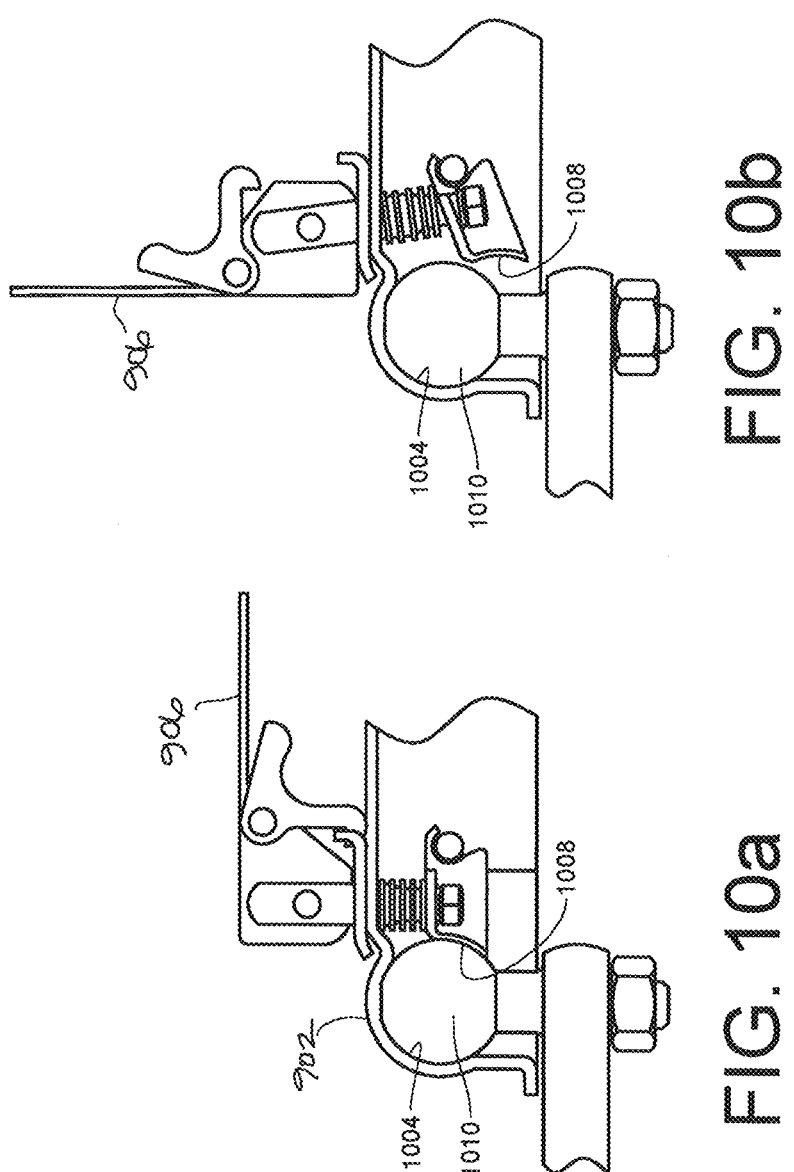
FIGS. 10*a* and 10*b* are partial cross-sectional depictions of the coupler in FIG. 9 in the clamped and unclamped positions, respectively, consistent with illustrative embodiments.
Figure 11:
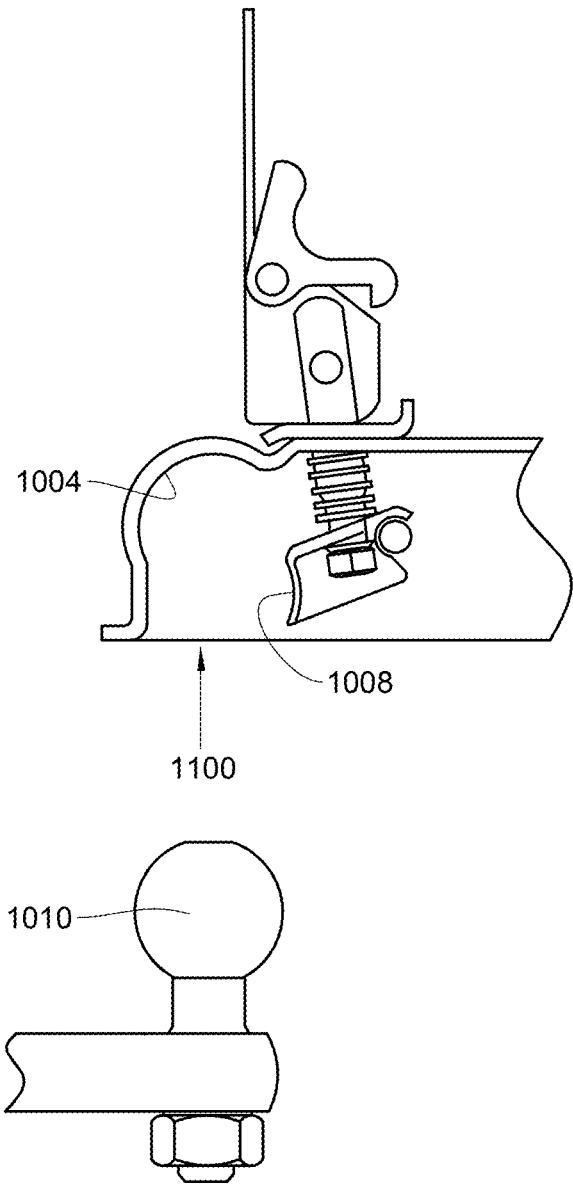
FIG. 11 depicts the unclamped coupler in FIG. 10*b* with the ball hitch removed from the coupler, consistent with illustrative embodiments.

As depicted in the partial cross-sectional depictions of FIGS. 10a, 10b, and 11, the coupler 902 in these illustrative embodiments partially encloses a ball socket 1004 that terminates at a ball socket opening 1100 in the coupler 902. A latch 906 mounted to the coupler 902 is configured to move a ball clamp 1008 inside the ball socket 1004 between a clamped position as depicted in FIG. 10a and an unclamped position as depicted in FIG. 10b. An appropriately sized ball hitch 1010 can be inserted through the ball socket opening 1100 and into the ball socket 1004 inside the coupler 902. After the ball hitch 1010 is fully inserted, the latch 906 can be operated to move the ball clamp 1008 to the clamped position where it is urged into a sliding relationship against the ball hitch 1010. Thus, the ball clamp 1008 at the clamped position constrains the ball hitch 1010 from being withdrawn from the ball socket 1004 yet permits rotational movement of the ball hitch 1010 relative to the ball socket 1004 and the ball clamp 1008. This allows the towing vehicle 108 (FIG. 1) to be steered to turn different directions while towing the trailer 100.

Figure 13:
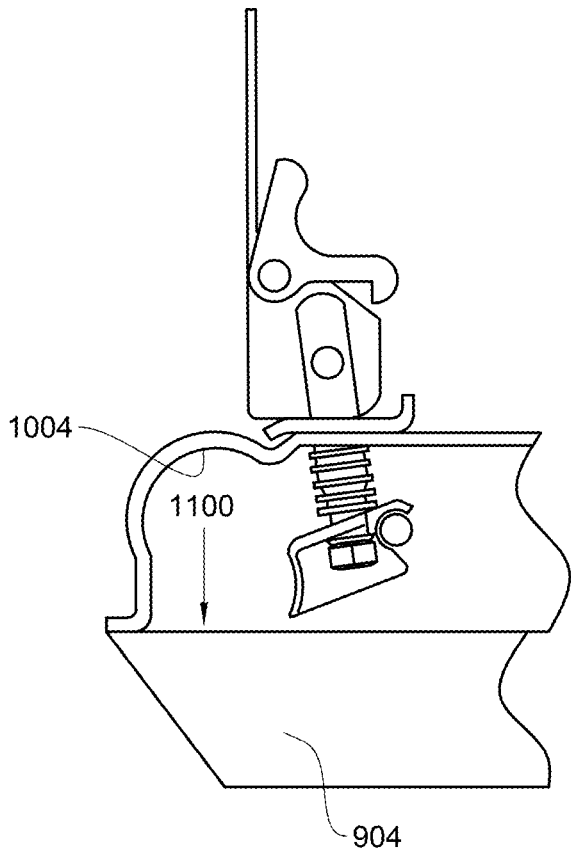
FIG. 13 depicts a side view of the trailer security device in the locked condition to block the ball socket opening as in FIG. 9, consistent with illustrative embodiments.

Returning to FIG. 9, the trailer security device 900 is depicted having a slideout 904 in the locked position, where it blocks access to the ball socket opening 1100 (FIG. 11) on the bottom side of the coupler 902, consistent with illustrative embodiments. This is better viewed in the cross-sectional depiction of FIG. 13. In this locked condition, the trailer 100 is secured from unauthorized use by making it impossible to insert a ball hitch 1010 through the ball socket opening 1100 and into the coupler's ball socket 1004.

Figure 12:
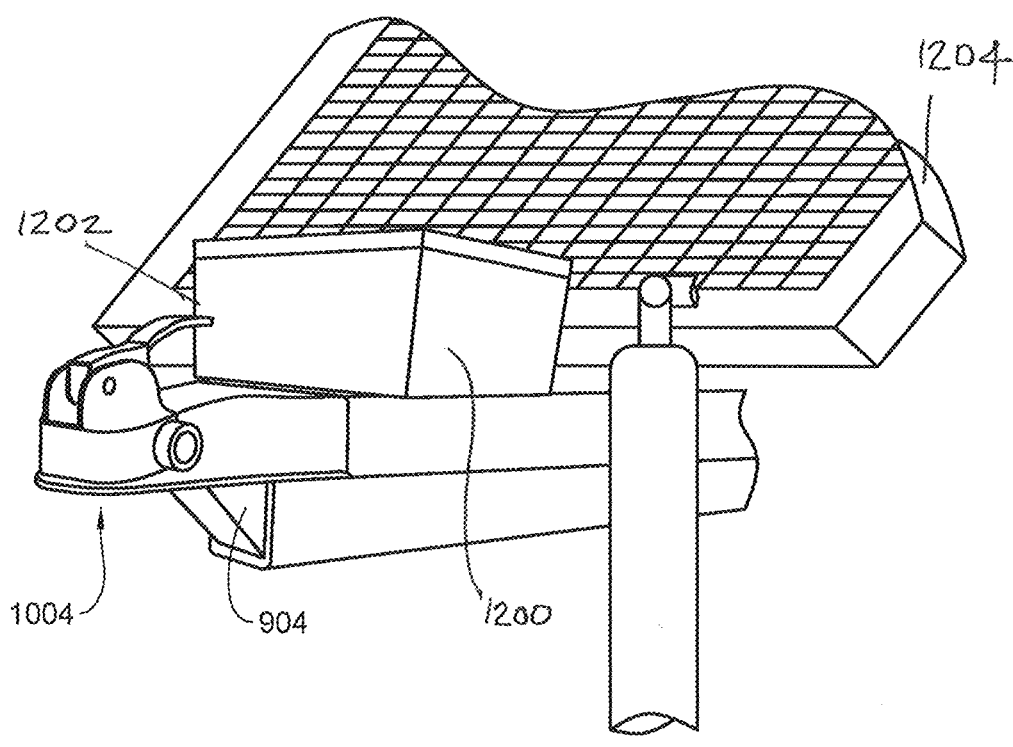
FIG. 12 is similar to FIG. 9 but depicting the trailer security device in the unlocked condition, consistent with illustrative embodiments.

As further described below, the security device 900 of these exemplary embodiments can have an actuator 1400 (FIG. 14) that is configured to selectively extend the slideout 904 to the locked (or secured) position depicted in FIG. 9. Alternatively, the actuator 1400 can retract the slideout 904 away from the ball socket opening 1100 as depicted in FIG. 12. This provides access to the ball socket opening 1100, such as in order to grant an authorized use of the trailer 100. The actuator 1400 can be an electrical device that is powered by an onboard battery 1200 (FIG. 12) that can be stored in a protective enclosure 1202. An onboard renewable power source 1204, such as the solar panel depicted in FIG. 12, can be configured to electrically charge the battery 1200.

Figure 14:
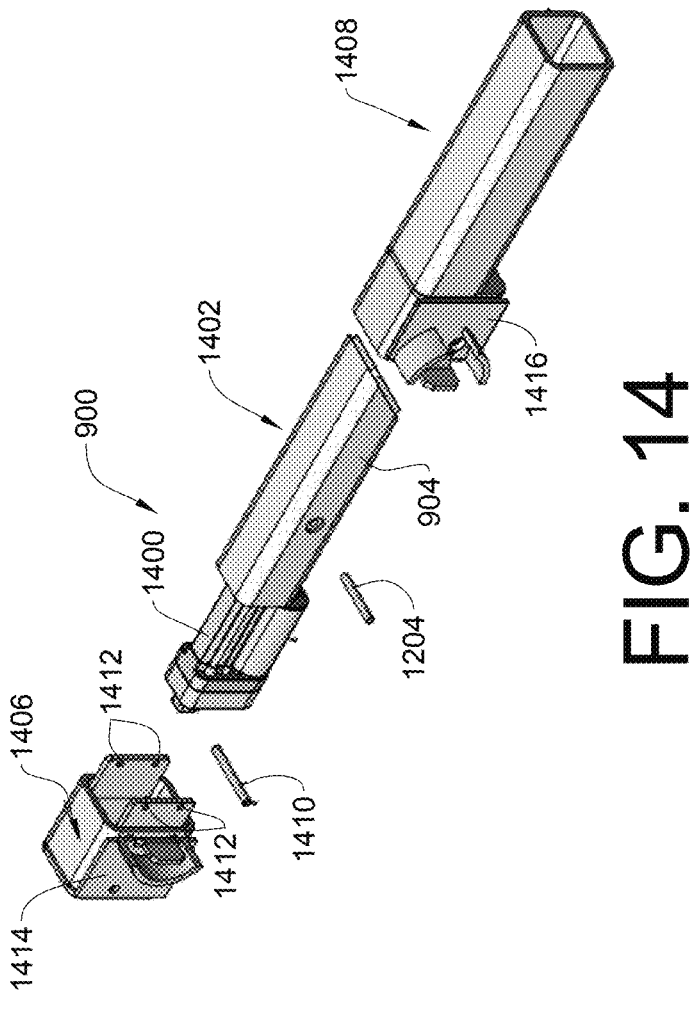
FIG. 14 is an exploded isometric depiction of the trailer security device of FIGS. 9 and 12, consistent with illustrative embodiments.

FIG. 14 is an exploded isometric depiction of a portion of the trailer security device 900 in FIGS. 9 and 12. In these illustrative embodiments, a slideout assembly 1402 can be connected to the actuator's 1400 stroke rod (not depicted). For example, a precision dowel pin 1404 can be inserted through mating holes in the actuator's stroke rod and in the slideout 904 portion of the slideout assembly 1402. This fixes the slideout 904 to the linear reciprocating movement of the actuator's stroke rod. Here the exemplary actuator can be a 12-volt waterproof (or even saltwater proof) electric linear actuator, such as the PA-10 series of linear actuators sold by Progressive Automations of Richmond, British Columbia.

The actuator 1400 and slideout assembly 1402 can be situated within a two-piece protective housing made up of an actuator mount assembly 1406 joined to a hollow slideout guard assembly 1408. The actuator 1400 is connected to the actuator mount assembly 1406 by another precision dowel pin 1410. The slideout assembly 1402 is configured to reciprocate within the closely mating inner surface of the slideout guard assembly 1408. For the sake of reliable security, the actuator mount assembly 1406 can be connected to the trailer tongue 104 (FIG. 1) so that it is not easily removable, such as by welding them together. In alternative embodiments the actuator mount assembly 1406 can be welded to a member of the frame 102 that is, in turn, welded to the tongue 104. For the sake of easy access to the actuator 1400 for service or repair, the slideout guard assembly 1408 can be connected to the actuator mount assembly 1406 by removable fasteners (not depicted) passing through holes 1600 (FIG. 16) in the slideout guard assembly 1408 and mating holes 1412 in the actuator mount assembly 1406.

The actuator mount assembly 1406 can have a puck hasp 1414, and the slideout guard assembly 1408 can have a mating puck hasp 1416. Attaching the slideout guard assembly 1408 to the actuator mount assembly 1406 brings the puck hasps 1414, 1416 together in a mating relationship so that they can be locked together by a conventional puck lock (not depicted). Thus, a tamper proof yet readily accessible attachment of the trailer security device 900 in these illustrative embodiments is provided by the permanent attachment of the actuator mount assembly 1406 to the trailer's tongue 104 (FIG. 1) and the locked attachment of the slideout guard assembly 1408 to the actuator mount assembly 1406.

Figure 15:
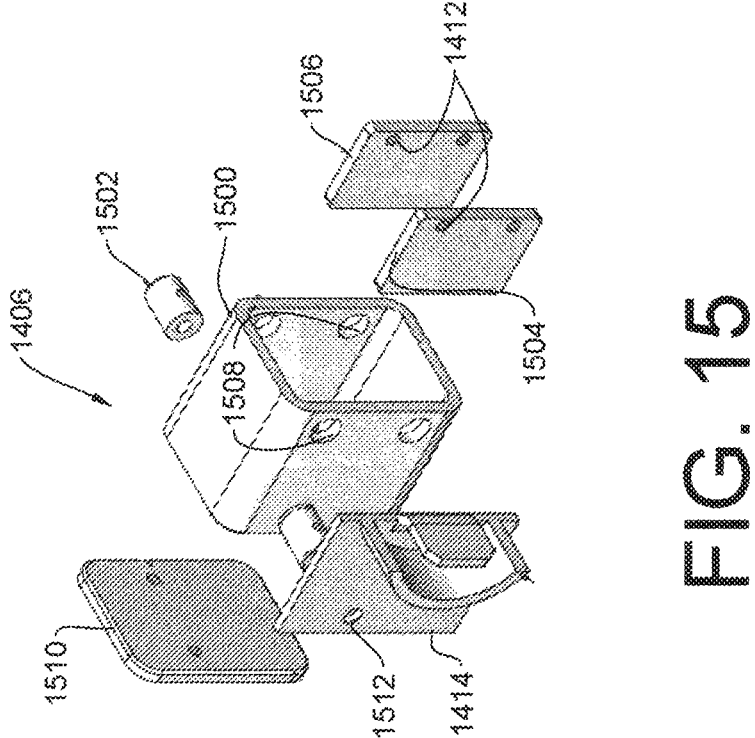
FIG. 15 is an exploded isometric depiction of the actuator mount portion of the trailer security device of FIGS. 9 and 12, consistent with illustrative embodiments.

FIG. 15 is an exploded isometric depiction of the actuator mount assembly 1406 in these illustrative embodiments. A motor cover 1500 can be constructed of square tubing. Bushings 1502 can be press fit into opposing sides of the motor cover 1500 and receive the dowel pin 1410 (FIG. 12) for attaching the actuator 1400 at its fixed end. Side joining plates 1504, 1506 can be spot welded to the motor cover 1500 via access openings 1508. A rear cover plate 1510 and the puck hasp 1414 can be permanently connected to the motor cover 1500 such as by welding them together. Note that in these embodiments the puck hasp 1414 can have a clearance hole 1512 for passage of the dowel pin 1410 (FIG. 14) connecting the actuator 1400 to the actuator mount assembly 1406.

Figure 16:
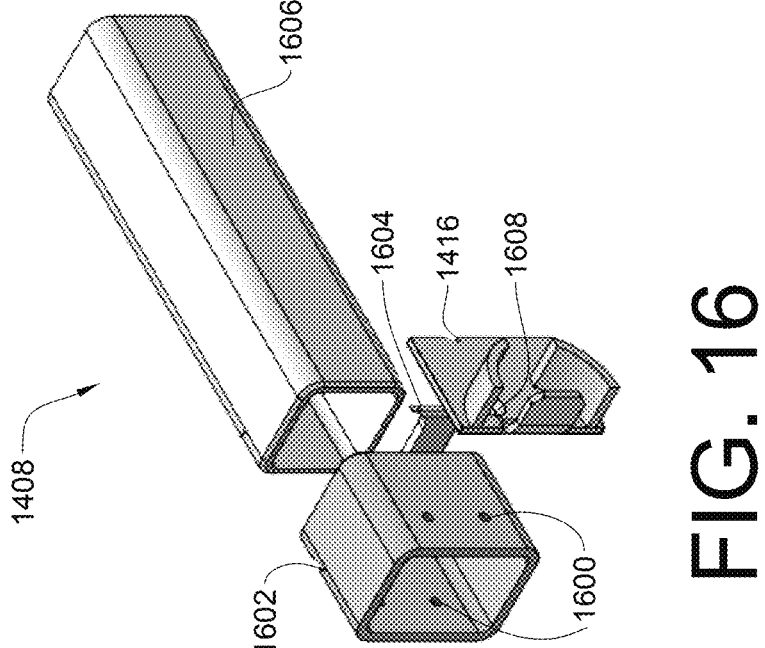
FIG. 16 is an exploded isometric depiction of the guiding sleeve portion of the trailer security device of FIGS. 9 and 12, consistent with illustrative embodiments.

FIG. 16 is an exploded isometric depiction of the slideout guard assembly 1408 in these illustrative embodiments. Another motor cover 1602 can be constructed of square tubing, like the motor cover 1500 discussed above. A front motor cover 1604 and a slideout cover 1606 are each permanently connected to the inside of the motor cover 1602, such as by welding them together. The puck hasp 1416 is likewise permanently connected to the motor cover 1602 such as by welding. Note that the puck hasp 1416 has clearance openings 1608 (only one depicted) aligned with the openings 1600 in the motor cover 1602, providing access for the removable fasteners connecting the slideout guard assembly 1408 to the actuator mount assembly 1406.

Figure 17:
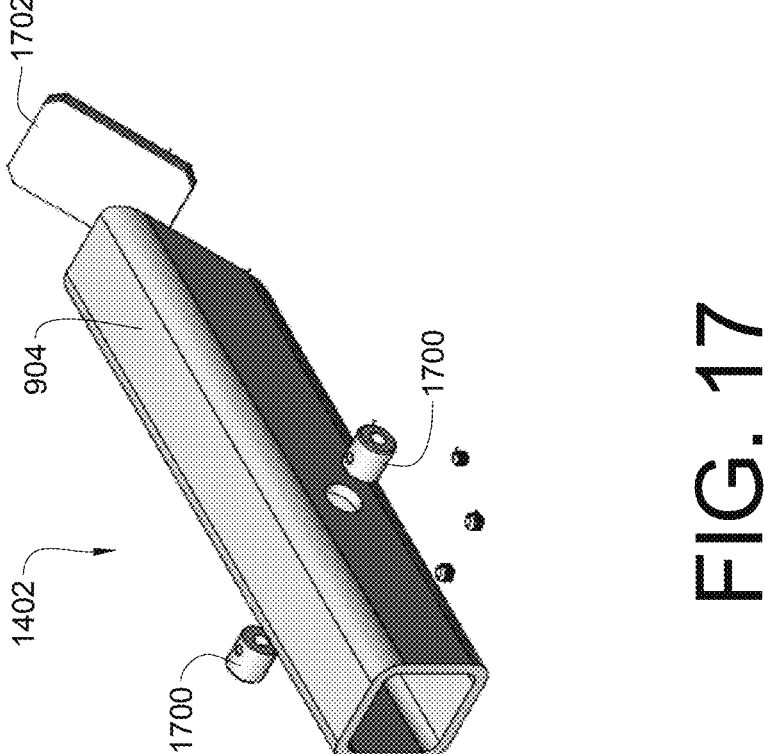
FIG. 17 is an exploded isometric depiction of the slideout portion of the trailer security device of FIG. 9 and FIG. 12, consistent with illustrative embodiments.

FIG. 17 is an exploded isometric depiction of the slideout assembly 1402 in these illustrative embodiments. The slideout 904 can be constructed of square tubing that is configured for a closely sliding engagement inside the slideout guard 1606 (FIG. 16). Bushings 1700 can be press fit into opposing sides of the slideout 904 for receiving the dowel pin 1404 (FIG. 14) used to connect the slideout 904 to the actuator's stroke rod (not depicted). An end cap 1702 can be permanently connected to the leading end of the slideout 904, such as by welding them together.

In these illustrative embodiments, the RE engine 101 can selectively operate the actuator 1400 to extend the slideout 904 to the locked position to prevent use of the trailer, and alternatively to retract the slideout 904 to the unlocked position for an authorized use of the trailer. These embodiments are merely illustrative and in no way limiting of the contemplated embodiments of this invention. For example, the locking mechanism (such as the slideout 904) need not necessarily be movable in a linear reciprocating movement. In equivalent alternative embodiments the locking mechanism can move in different ways such as rotationally, transversely, vertically, and the like. Furthermore, in other equivalent embodiments the linear reciprocating slideout described herein can be selectively extended to unlock the trailer's coupler for an authorized use of the trailer, and alternatively retracted to lock the trailer's coupler to prevent use of the trailer.

The trailer 100 can be equipped with an onboard wireless communications interface such as a subscriber identity module (SIM) computer technology that provides a cellular network gateway. This provides support for hosting a global positioning system (GPS) to track the trailer and to monitor processor-controlled parameters and attributes of the trailer and its trailer security device 900, such as but not limited to the location of the trailer as compared to an authorized zone of travel, the speed at which the trailer is being towed, the present locked or unlocked status of the trailer security device, and the like. This also allows remote computer signaling control of the trailer security device 900 via the wireless network 103, such as locking or unlocking it perhaps by a remote user, or automatically by a computer application executing on the network 103. The wireless communications interface can also, or alternatively, include wireless fidelity (Wi-Fi) computer technology for communicating via the Internet, Bluetooth computer technology, radio frequency identification (RFID) technology, dedicated short-range communication (DSRC) technology, long range (LORA) technology, and the like. Network communications are preferably via a high-speed communications bus in the trailer security device 900 so that it can simultaneously process computer instructions and data via the network 103.

Returning to the controlling method 700 in FIG. 7, during the rental duration block 716 continuously monitors for another network communication from the renter indicating he is returning the rented trailer. If the return doesn't occur before the agreed-to rental duration expires, then block 718 manages accounting for late-return surcharging. When the return communication is received, then block 720 requires new return data. This can include the renter sending one or more photographs to document the trailer's condition at return. When block 720 is satisfied with the new return data, then block 722 can send a network signal to lock the trailer security device 900 and then turn its power off until the next rental. Block 724 can include the new return data in future ML model training epochs.

These illustrative embodiments demonstrate unlimited possibilities that can arise by leveraging the data stored in these and other business transactions. For example, without limitation, cellular connectivity affords live and historical GPS data. That data can be strategically leveraged to numerous benefits, such as defining a geographical demand profile that can be used to dynamically optimize new and existing rental locations, in real time. Numerous external marketing opportunities for this data exist as well with third parties. Trailers can be individually monitored and predictively maintained, such that the best available equipment is made available for lease. Geofencing can ensure the trailer is only used in an authorized territory, and that it is returned to the correct place.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

What is claimed:

1. A security system for equipment having a frame including a towing tongue supporting a coupler that defines a hitch socket opening, the security system comprising:

a security device, comprising:

an actuator mount assembly permanently affixed to the frame and having a first hasp;

an actuator attached to the actuator mount assembly;

a slide out assembly attached to the actuator and selectively positionable, by activating the actuator, between a first position to close the hitch socket opening and a second position to open the hitch socket opening; and

a slide out guard assembly having a second hasp and enclosing the actuator and the slide out assembly; and a removable lock securing the first and second hasps together;

security engine logic operable in a distributed computer network to process user requests to lock or unlock the security device; and a wireless communications interface autonomously responsive to the security engine logic and configured to selectively activate the actuator via the distributed computer network.

2. The security system of claim 1 wherein the security engine logic selectively connects a battery to electrically energize the actuator.

3. The security system of claim 2 further comprising a renewable power device configured to electrically charge the battery.

4. The security system of claim 1 wherein the removable lock comprises a puck lock.

*   *   *   *   *